United States Patent
Jenq et al.

(10) Patent No.: US 7,039,005 B2
(45) Date of Patent: May 2, 2006

(54) PROTECTION SWITCHING IN A COMMUNICATIONS NETWORK EMPLOYING LABEL SWITCHING

(75) Inventors: Yau-Ren Jenq, Fort Lee, NJ (US); Indra Widjaja, Florham Park, NJ (US)

(73) Assignee: Fujitsu Limited, Kanagawa-ken (JP)

( * ) Notice: Subject to any disclaimer, the term of this patent is extended or adjusted under 35 U.S.C. 154(b) by 994 days.

(21) Appl. No.: 09/969,564

(22) Filed: Oct. 2, 2001

(65) Prior Publication Data

US 2003/0063560 A1    Apr. 3, 2003

(51) Int. Cl.
*G01R 31/08* (2006.01)

(52) U.S. Cl. .................. 370/217; 370/225; 370/244

(58) Field of Classification Search .............. 370/216, 370/217, 218, 221, 225, 228, 242, 244
See application file for complete search history.

(56) References Cited

U.S. PATENT DOCUMENTS

| | | | |
|---|---|---|---|
| 2,733,296 A | 1/1956 | Maggio | 179/15 |
| 5,838,924 A | 11/1998 | Anderson et al. | 395/200.69 |
| 6,023,452 A | 2/2000 | Shiragaki | 370/227 |
| 6,049,523 A | 4/2000 | Anderson et al. | 370/217 |
| 6,141,319 A | 10/2000 | Dighe et al. | 370/218 |
| 6,163,525 A | 12/2000 | Bentall et al. | 370/227 |
| 6,205,117 B1 | 3/2001 | Doshi et al. | 370/228 |
| 6,249,510 B1 | 6/2001 | Thompson | 370/223 |
| 6,252,831 B1 | 6/2001 | Wehmeyer | 369/30 |
| 6,272,107 B1* | 8/2001 | Rochberger et al. | 370/216 |
| 6,359,857 B1 | 3/2002 | Ahmad et al. | 370/217 |
| 6,657,952 B1* | 12/2003 | Shiragaki et al. | 370/223 |
| 6,795,394 B1* | 9/2004 | Swinkels et al. | 370/222 |
| 6,865,149 B1* | 3/2005 | Kalman et al. | 370/225 |
| 6,895,441 B1* | 5/2005 | Shabtay et al. | 709/238 |
| 2003/0058869 A1* | 3/2003 | Novick | 370/395.43 |
| 2003/0063613 A1* | 4/2003 | Carpini et al. | 370/401 |

* cited by examiner

*Primary Examiner*—Ricky Q. Ngo
*Assistant Examiner*—Christine Ng
(74) *Attorney, Agent, or Firm*—Weingarten, Schurgin, Gagnebin & Lebovici LLP (57) ABSTRACT

A system and method of protection switching in a communications network that makes more efficient use of resources in the network and reduces the loss of data traffic carried by the network. The communications network includes an established working path and an established protect path interconnecting a source node and a sink node. The source node and the sink node are configured to perform label switching on the network. The source node receives primary data traffic and secondary data traffic over one or more communications paths. In a fault-free condition, the source node sends the primary data traffic over the working path to the sink node, and sends the secondary data traffic over the protect path to the sink node. In the event of a fault or switchover condition in the working path, the source node performs traffic trunk and label merging on the primary and secondary traffic, and sends the merged traffic over the protect path to the sink node.

18 Claims, 5 Drawing Sheets

PROTECTION SWITCHING IN A COMMUNICATIONS NETWORK EMPLOYING LABEL SWITCHING

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to protection switching techniques in communications networks, and more specifically to a protection switching technique that makes more efficient use of network resources.

In recent years, Internet Service Providers (ISPs) and operators of communications networks have increasingly employed protection switching techniques to enhance the level of survivability of the networks in the event of a fault caused by, e.g., the failure of a node in the network, the failure of a link interconnecting network nodes, or a switchover condition. By employing such protection switching techniques, ISPs and operators of communications networks seek to assure fast recovery from network faults with minimal disruption to traffic flow on the network.

A conventional protection switching technique, commonly known as 1+1 protection switching, requires the provision of both a "working" communications path and a "protect" communications path between a pair of nodes in a communications network. For example, the working path and the protect path may be provided between a source node and a sink node in a "protected" domain of the communications network. Further, the working path and the protect path may include respective pluralities of nodes interconnected by respective communications links.

In the 1+1 protection switching technique, the source node receives incoming data traffic and sends outgoing data traffic to the sink node over both the working path and the protect path simultaneously. In the event the working path is in a fault-free condition, the sink node selectively receives the data traffic provided over the working path and ignores the data traffic carried by the protect path. In the event of a fault in the working path caused by, e.g., a node/link failure or a switchover condition, the sink node receives notification of (or otherwise identifies) the fault and subsequently selects the data traffic carried by the protect path. Because the sink node can select the data traffic on the protect path as soon as it identifies the fault on the working path, the 1+1 protection switching technique allows fast recovery from node or link failures in communications networks with minimal disruption to the data traffic carried by the network.

However, the 1+1 protection switching technique has drawbacks in that at least twice the amount of bandwidth must be reserved for sending the data traffic from the source node to the sink node than would normally be required for data transmission without such protection switching. This results in inefficient use of network resources and increases in the overall complexity and cost of the communications network.

Another conventional protection switching technique, commonly known as 1:1 protection switching, also requires the provision of a working communications path and a protect communications path between a source node and a sink node in a communications network. However, instead of sending outgoing data traffic to the sink node over both the working and protect paths simultaneously as in the 1+1 protection switching technique, the 1:1 protection switching technique only requires the source node to send "protected" data traffic to the sink node over the working path. In the event the working path is in the fault-free condition, the source node may also send "unprotected" data traffic over the protect path to the sink node, which may subsequently receive both the protected and unprotected data traffic provided over the working and protect paths, respectively. In the event of a fault in the working path or a switchover condition, the source node sends the protected data traffic to the sink node over the protect path instead of the working path and discards the unprotected data traffic.

Because the additional bandwidth provided by the protect path is used for sending unprotected data traffic to the sink node when the working path is in the fault-free condition, the 1:1 protection switching technique generally makes more efficient use of network resources than the 1+1 protection switching technique. However, the 1:1 protection switching technique also has drawbacks in that when there is a fault in the working path, the recovery from the fault causes minimal disruption to the protected data traffic but allows the unprotected data traffic to be lost.

It would therefore be desirable to have a protection switching technique that can be employed to enhance the level of survivability of a communications network in the event of a fault. Such a protection switching technique would make more efficient use of resources in the communications network. It would also be desirable to have a protection switching technique that reduces the loss of data traffic carried by the network.

BRIEF SUMMARY OF THE INVENTION

In accordance with the present invention, a system and method of performing protection switching in a communications network is disclosed that makes more efficient use of resources in the network and reduces the loss of data traffic carried by the network. Benefits of the presently disclosed protection switching technique are achieved by providing a "protected" domain of the communications network, in which a source node and a sink node are configured to perform traffic trunk and label merging to minimize disruption to "primary" data traffic in the event of a network fault while reducing undesired loss of "secondary" data traffic carried by the network.

In one embodiment, the protected domain of the communications network comprises at least one established "working" communications path and at least one established "protect" communications path interconnecting the source node and the sink node. The working path and the protect path are established by a suitable signaling protocol that programs and maintains the working and protect paths. Each of the working and protect paths may include one or more intermediate nodes and a plurality of respective communications links communicably coupling the one or more intermediate nodes to the source and sink nodes. Further, each of the source node, the intermediate nodes of the working and protect paths (if any), and the sink node is configured to perform label switching on the network.

The source node receives the primary data traffic and the secondary data traffic over one or more communications paths from at least one first node located outside the protected domain. In a fault-free condition, the source node sends the primary data traffic over the working path, which transfers the primary data traffic comprising at least one data unit from the source node to the sink node. The source node further sends the secondary data traffic over the protect path, which similarly transfers the secondary data traffic comprising at least one data unit from the source node to the sink node.

In a preferred embodiment, the communications network employs Multi-Protocol Label Switching (MPLS) to map the address of the sink node to a single label or a sequence of labels carried by the at least one data unit as it is conveyed from the source node to the sink node. Such a network supports a variety of Layer-2 switching protocols such as the Internet Protocol (IP), the Asynchronous Transfer Mode (ATM) protocol, and the frame relay protocol. Accordingly, the source node, the intermediate nodes (if any), and the sink node comprise respective Label Switching Routers (LSRs) configured to perform label switching on the network, and the working path and the protect path comprise respective Label Switched Paths (LSPs) that are established prior to the transmission of data from the source node to the sink node.

In the disclosed embodiment, the primary data traffic comprises at least one primary traffic flow of a first predetermined Quality of Service (QoS) level, and the secondary data traffic comprises at least one secondary traffic flow of a second predetermined QoS level. Further, each data unit of the primary and secondary traffic flows has a respective label associated therewith. The source node, the intermediate nodes of the working and protect paths (if any), and the sink node forward the data units of the primary and secondary traffic flows along the established working and protect paths, respectfully, in accordance with the labels associated with the data units of the primary and secondary traffic flows. Such forwarding of data along previously established communications paths is commonly known as "explicit routing".

In the fault-free condition, the sink node receives the primary traffic flow provided over the working path and the secondary traffic flow carried by the protect path, merges the primary and secondary traffic flows, and sends the merged traffic flow over a single communications path to a second node located outside the protected domain. In the event the second node outside the protected domain is configured to perform label switching, the sink node also merges the labels associated with the data units of the respective traffic flows. Specifically, the sink node receives at least one data unit of the primary traffic flow with a first associated incoming label and at least one data unit of the secondary traffic flow with a second associated incoming label, and sends the data units of the merged traffic flow with the same associated outgoing label to the second node outside the protected domain. If the second node outside the protected domain is not configured for label switching, then the sink node does not perform such label merging.

In the event of a fault in the working path such as a node/link failure or a switchover condition, the source node receives notification of the fault or switchover condition, and performs traffic trunk and label merging on the incoming primary and secondary traffic flows. Specifically, the source node merges the primary and secondary traffic flows and sends the data units of the merged traffic flow over the protect path with the same associated outgoing label to the sink node; the source node then sends no data traffic over the working path. Further, the sink node receives the merged traffic flow over the protect path while ignoring any information that might be carried by the working path, and sends the merged traffic flow to the second node outside the protected domain. In a preferred embodiment, the primary and secondary traffic flows are sent over the protect path while accommodating bandwidths required by the first and second predetermined QoS levels, respectively, assigned thereto.

In the event the merged traffic flow causes traffic congestion on the protect path that increases the risk of data loss on the protect path, the signaling protocol dynamically establishes a second explicitly routed protect path in addition to the first established protect path to allow the primary and secondary traffic flows to be sent to the sink node along the separate protect paths. In the disclosed embodiment, the second protect path is dynamically established to connect the source node or a selected one of the intermediate nodes of the working path (if any) to the sink node so that the network fault on the working path is by-passed. Further, the source node sends the primary traffic flow over the second protect path to the sink node, and sends the secondary traffic flow over the first protect path to the sink node. In an alternative embodiment, the secondary traffic flow is sent over the second protect path to the sink node, and the primary traffic flow is sent over the first protect path to the sink node. Finally, the sink node receives the primary and secondary traffic flows provided over the first and second protect paths, merges the primary and secondary traffic flows, and sends the merged traffic flow to the second node outside the protected domain of the communications network.

By selectively performing traffic trunk and label merging at a source node and a sink node of a protected network domain, both primary and secondary traffic flows can be sent over a protect path from the source node to the sink node in the event of a network fault or a switchover condition with minimal disruption to the primary data traffic and reduced loss of the secondary data traffic. Moreover, by dynamically establishing an alternate protect path in the event of high traffic congestion on the first established protect path, the loss of the secondary data traffic can be further reduced.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

A system and method are disclosed for providing protection switching in a communications network, in which network resources are used more efficiently and the loss of data traffic carried by the network is reduced. Such protection switching is achieved by providing a plurality of nodes in a protected domain of the communications network that can be configured to perform label switching and traffic trunk and label merging, and by dynamically establishing alternate communications paths through the protected network domain.

Figure 1:
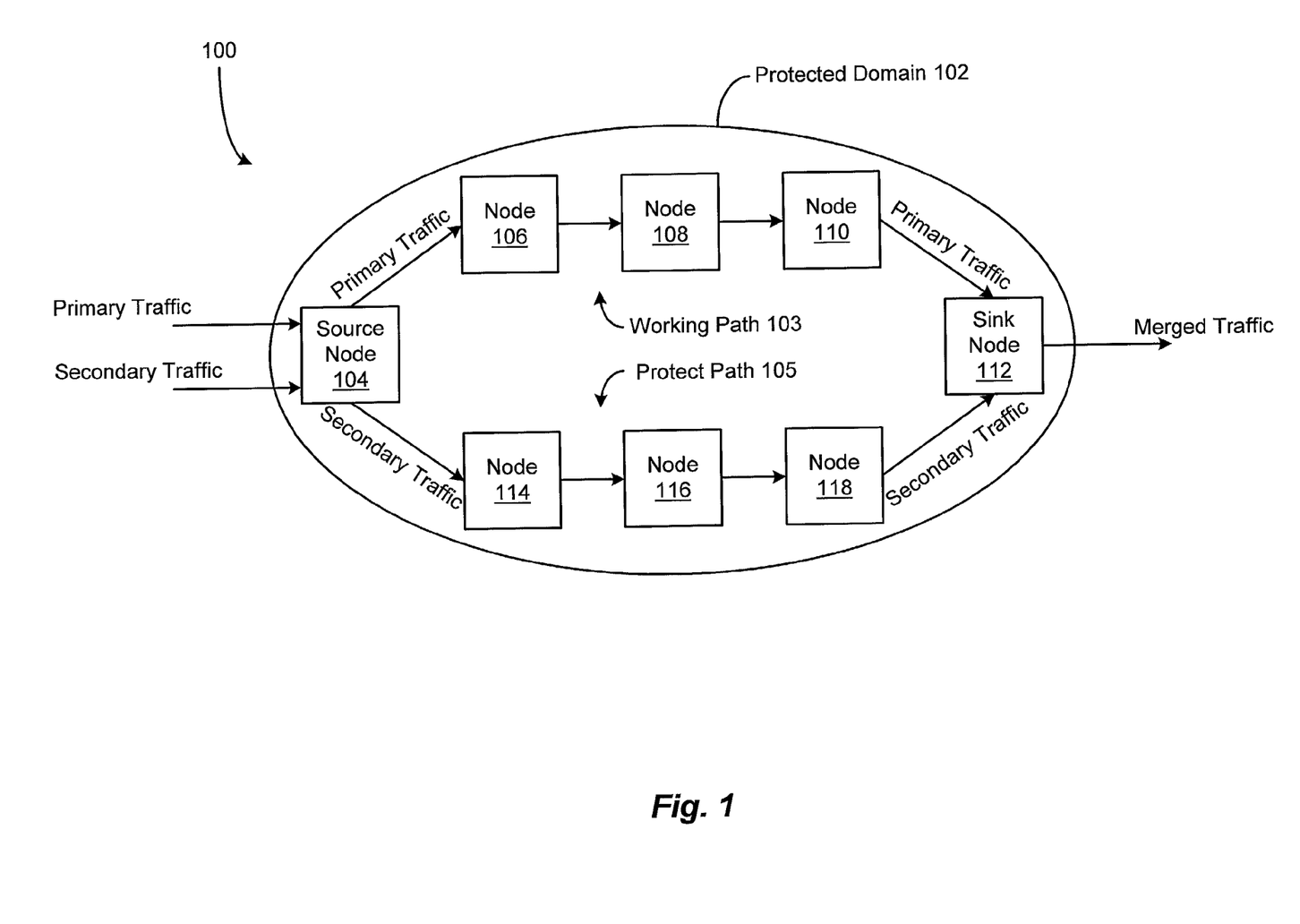
FIG. 1 is a block diagram depicting the operation of a protected domain of a communications network in a fault-free condition according to the present invention.

FIG. 1 depicts an illustrative embodiment of a communications network 100 including a protected domain 102, in accordance with the present invention. The protected domain 102 of the network 100 comprises a source node 104, a sink node 112, an established "working" communications path 103, and an established "protect" communications path 105. The working path 103 may include a plurality of intermediate nodes 106, 108, and 110 and one or more communications links (not numbered) communicably coupling the intermediate nodes 106, 108, and 110 (if any) to the source node 104 and the sink node 112. Similarly, the protect path 105 may include a plurality of intermediate nodes 114, 116, and 118 and one or more communications links (not numbered) communicably coupling the intermediate nodes 114, 116, and 118 (if any) to the source node 104 and the sink node 112.

In a preferred embodiment, the communications network 100 employs Multi-Protocol Label Switching (MPLS), and the source node 104, the sink node 112, and the intermediate nodes 106, 108, 110, 114, 116, and 118 comprise respective Label Switching Routers (LSRs) configured to perform label switching on the MPLS network. The respective LSRs at the source and sink node locations are also configured for selectively performing traffic trunk and label merging on traffic flows carried by the MPLS network. The operation of such an MPLS network are described in detail in Internet Draft draft-ietf-mpls-arch-07.txt July 2000, which is incorporated herein by reference. It should be understood, however, that the communications network 100 may comprise any suitable network having nodes that can be configured for label switching and traffic trunk and label merging such as an Internet Protocol (IP) network, an Asynchronous Transfer Mode (ATM) network, or a frame relay network.

It is further noted that each of the nodes 104, 106, 108, 110, 112, 114, 116, and 118 of the protected network domain 102 may comprise a computer system or some other device such as a router or switch. In general, each node comprises a computerized device including at least one processor operative to execute programmed instructions out of a memory, which may comprise Random Access Memory (RAM) or a combination of RAM and Read-Only Memory (ROM). Specifically, each node is suitably programmed to implement a signaling protocol for establishing, modifying, tearing-down, or monitoring the condition of the working and protect paths 103 and 105. For example, in an MPLS network, the signaling protocol may be a connection-oriented protocol such as the Constraint-based Routing Label Distribution Protocol (CR-LDP) or a connectionless protocol such as the Resource Reservation Protocol (RSVP-TE). The nodes are also suitably programmed to perform label switching, traffic trunk and label merging, and other functions attributable to the respective devices described herein.

The source node 104 is configured to receive "primary" data traffic and "secondary" data traffic over one or more communications paths from at least one node (not shown) in the communications network 100 located outside the protected domain 102. The primary data traffic and the secondary data traffic may be assigned to either the same Forwarding Equivalence Class (FEC) or different FECs. In general, a FEC is representative of a group of data units that are forwarded in the same manner, e.g., over the same communications path or with the same forwarding treatment. In the illustrated example, the primary data traffic comprises a primary traffic trunk for at least one traffic flow of a first predetermined Quality of Service (QoS) level, and the secondary data traffic comprises a secondary traffic trunk for at least one traffic flow of a second predetermined QoS level. For example, the first predetermined QoS level may be a constant bit-rate service class, and the second predetermined QoS level may be an unspecified bit-rate service class (i.e., "best effort" service). Moreover, each data unit (e.g., packet or cell) of the primary and secondary traffic flows has a respective label associated therewith indicating the FEC to which that label is bound. For example, the label may be encoded in an encapsulation header, a data link layer header, or a network layer header of the data unit.

The nodes 104, 106, 108, 110, 112, 114, 116, and 118 of the protected network domain 102 employ explicit routing to forward the data units of the primary and secondary traffic trunks along the established working and protect paths, respectively, in accordance with information included in the data unit labels. Specifically, each of the nodes 104, 106, 108, 110, 112, 114, 116, and 118 maintains a respective label switching forwarding table including a plurality of entries indexed by labels associated with incoming data units. Each entry typically includes (1) an outgoing label for a received incoming label, (2) an indication of an outgoing interface to be used for sending the data unit to a neighboring node, and (3) the address of the neighboring node. In the preferred embodiment, the working path 103 and the protect path 105 comprise respective explicitly routed Label Switched Paths (LSPs).

FIG. 1 depicts the operation of the protected network domain 102 in a fault-free condition. Specifically, the source node 104 receives the primary traffic flow over the primary traffic trunk and the secondary traffic flow over the secondary traffic trunk at respective incoming interfaces, and sends the primary traffic flow via an outgoing interface over the working path 103, which conveys the primary traffic flow from the source node 104 to the sink node 112 by way of the intermediate nodes 106, 108, and 110. The source node 104 also sends the secondary traffic flow via another outgoing interface over the protect path 105, which similarly conveys the secondary traffic flow from the source node 104 to the sink node 112 by way of the intermediate nodes 114, 116, and 118.

The sink node 112 receives the primary and secondary traffic flows at respective incoming interfaces, merges the primary and secondary traffic flows, and sends the merged traffic flow via an outgoing interface over a single communications path to another node (not shown) located outside the protected network domain 102. In the event this node outside the protected domain is configured to perform label switching, the sink node also merges the labels associated with the data units of the respective primary and secondary traffic flows. Specifically, the sink node 112 receives the labeled data units of the primary and secondary traffic flows at the respective incoming interfaces, and sends the data units of both traffic flows out the same outgoing interface with the same label. In the event the neighboring node outside the protected domain is not configured to perform label switching, the sink node 112 does not perform such label merging. For example, in this case, the sink node 112 may strip the labels from the data units before sending them out the outgoing interface.

Figure 2:
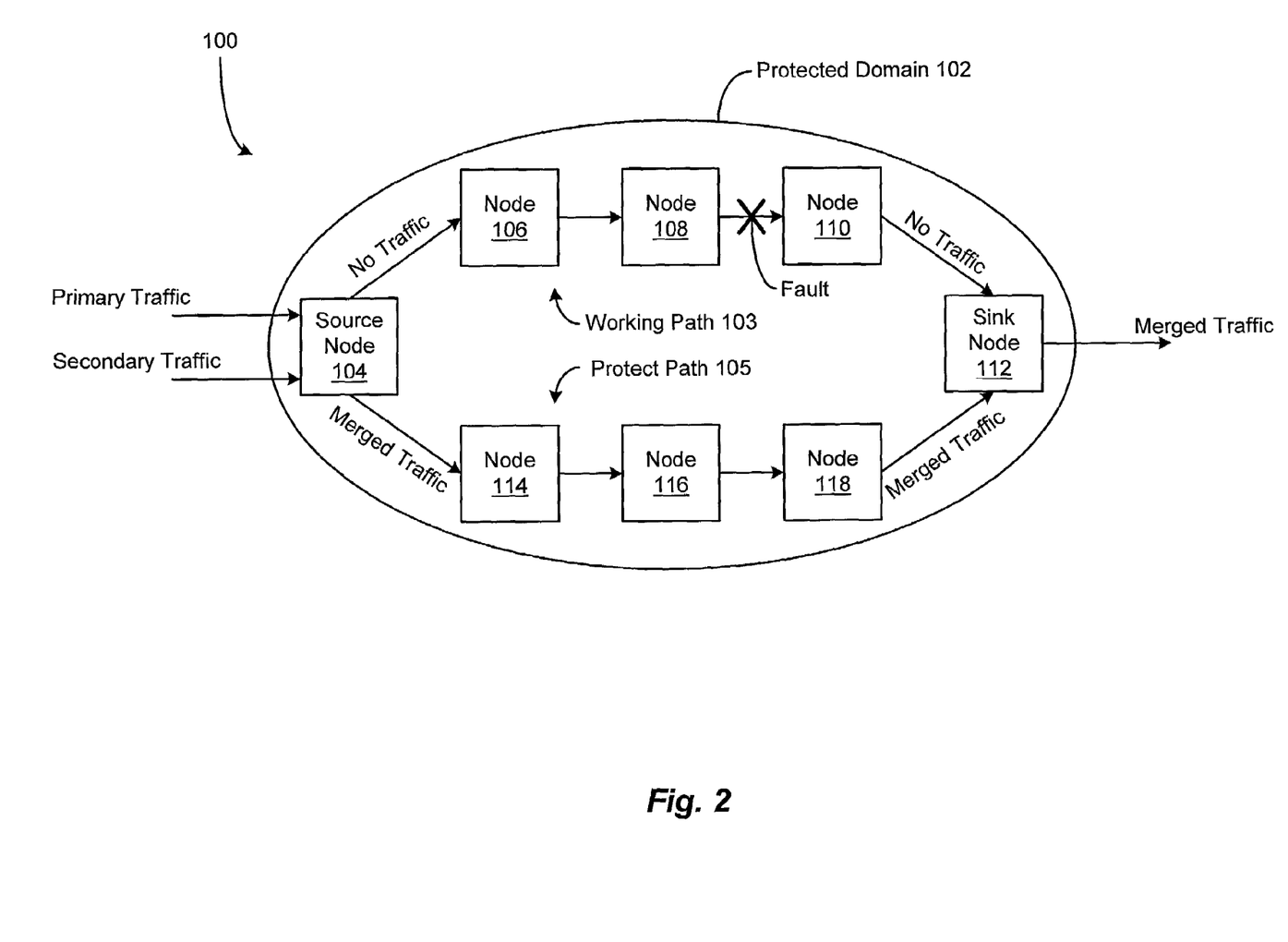
FIG. 2 is a block diagram depicting the operation of the protected domain of FIG. 1 in the event of a network fault.

FIG. 2 depicts the operation of the protected network domain 102 when there is a fault in the working path 103. In the illustrated example, the fault is a failure in the communications link communicably coupling the intermediate node 108 to the intermediate node 110 of the working path 103. After being notified of the fault, the source node 104 performs traffic trunk and label merging on the primary and secondary traffic flows, and sends the merged traffic flow over the protect path 105 to the sink node 112.

Figure 3:
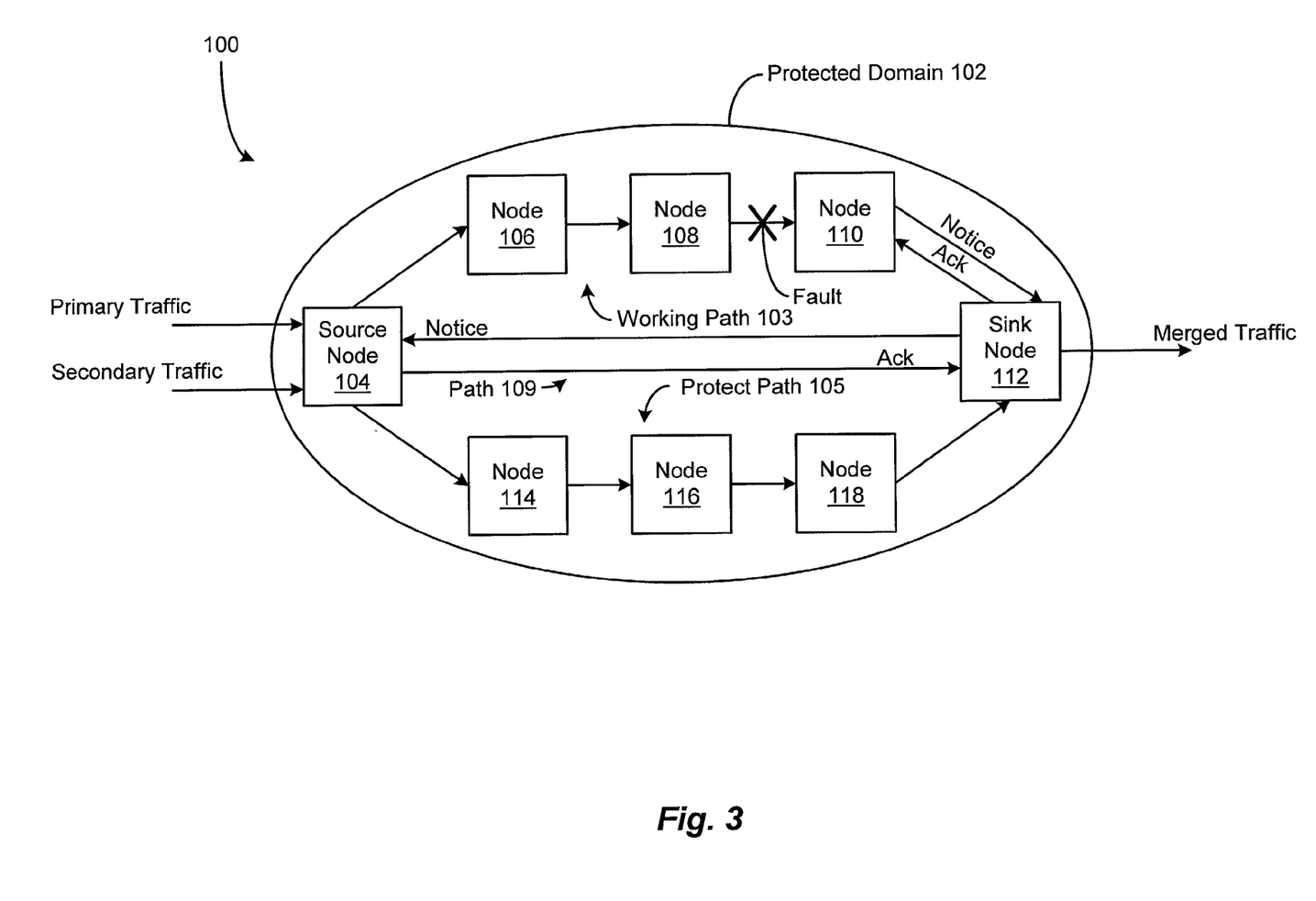
FIG. 3 is a block diagram of the protected domain of FIG. 1 depicting a network fault notification technique according to the present invention.

FIG. 3 is a block diagram of the protected network domain 102 depicting a network fault notification technique. In the illustrated example, the intermediate node 110 of the working path 103 is configured to detect a fault in the communications link (not numbered) coupling the intermediate node 108 to the intermediate node 110. It should be understood that the network fault notification technique may be suitably modified to provide notification of a fault in any node or link included in the protected domain 102 or provide notification of a switchover condition.

Specifically, the intermediate node 110 detects the fault between the intermediate nodes 108 and 110 at an incoming interface, and sends an "in-band" fault notification message (Notice) to the sink node 112 via the communications link (not numbered) coupling the intermediate node 110 to the sink node 112. Such an in-band fault notification message is sent from the intermediate node 110 to the sink node 112 along the same communications link used to send data units to the sink node 112 in the fault-free condition. After receiving the fault notification message, the sink node 112 sends an in-band acknowledgment message (Ack) to the intermediate node 110. In this way, it is assured that the fault notification message has been reliably received at the sink node 112. In the preferred embodiment, the intermediate node 110 re-sends the fault notification message to the sink node 112 if it does not receive the acknowledgment message within a certain timeout interval. It is understood that the fault notification and acknowledgment messages may alternatively be sent as "out-of-band" messages so that these messages and the data units are sent between neighboring nodes along different communications links.

Next, the sink node 112 sends a fault notification message to the source node 104, and the source node 104 sends an acknowledgment of the fault notification to the sink node 112. In the illustrated example, the fault notification and acknowledgment messages are sent via a viable communications path 109 (see FIG. 3) provided between the source node 104 and the sink node 112 that by-passes the working and protect paths 103 and 105. In this way, it is assured that the fault notification and acknowledgement messages sent between the sink node 112 and the source node 104 do not traverse a faulty communications path.

To assure that the notification of the faulty working path 103 is reliably received at the source node 104, the sink node 112 may send fault notification messages to the source node 104 along a plurality of diverse paths. For example, the sink node 112 may send a first fault notification message via the communications path 109, and send a second fault notification message over the protect path 105. For example, the second fault notification message may be sent over the protect path 105 from the sink node 112 to the source node 104 over an established LSP. Similarly, the source node 104 may send first and/or second acknowledgement messages to the sink node 112 in response to the respective fault notification messages over the corresponding communications paths.

As described above, after receiving and acknowledging the fault notification message, the source node 104 performs traffic trunk and label merging on the primary and secondary traffic flows, and sends the merged traffic flow over the protect path 105 to the sink node 112. Specifically, the source node 104 receives the labeled data units of the primary and secondary traffic flows at respective incoming interfaces, and sends the data units of both traffic flows out the same outgoing interface with the same label. As shown in FIG. 2, the source node 104 sends the merged traffic flow to the intermediate node 114 of the protect path 105. The merged traffic flow is then sent hop-by-hop to the intermediate nodes 116 and 118 of the established protect path 105 until it reaches the sink node 112. It is noted that the source node 104 sends no data traffic over the faulty working path 103.

Moreover, the sink node 112 suitably modifies the binding between the label associated with the merged traffic flow and the FEC so that the sink node 112 only accepts data traffic from the intermediate node 118 of the protect path 105 for this FEC, and no longer accepts data traffic from the intermediate node 110 of the faulty working path 103 for this FEC. Finally, the sink node 112 sends the merged traffic flow comprising the primary and secondary traffic flows to a node (not shown) located outside the protected network domain 102.

In the illustrated embodiment, the working and protect paths 103 and 105 are configured to accommodate bandwidths required by the first and second predetermined QoS levels of the primary and secondary traffic flows, respectively. For example, the working path 103 may be established with a predetermined reserved bandwidth "B" sufficient to accommodate the first predetermined QoS level of the primary traffic flow. Similarly, the protect path 105 may be established with the same reserved bandwidth "B" to accommodate at least the first predetermined QoS level of the primary traffic flow when the working path 103 is in a fault or switchover condition. In the event the primary traffic trunk includes a plurality of primary traffic flows not all of which need to be protected in the fault or switchover condition, either (1) the protect path 105 may be established with a reserved bandwidth less than "B" or (2) the reserved bandwidth of the protect path 105 may be re-negotiated to a value less than "B" after the fault or switchover condition is detected. In the illustrated example, if the protect path 105 cannot accommodate the total bandwidth required by the merged primary and secondary traffic flows in the fault or switchover condition, at least some of the secondary data traffic having the second predetermined QoS level (e.g., best effort service) may be lost.

It is noted that communications networks capable of accommodating bandwidths required by different QoS levels of traffic flows normally comprise a mechanism for scheduling transmission of the traffic flows in a prioritized manner. For the above-described exemplary case in which both the working and protect paths 103 and 105 are established with the same reserved bandwidth "B", the secondary traffic trunk may be incapable of using this reserved bandwidth because the scheduling mechanism may give the second predetermined QoS level of the secondary traffic flow (e.g., best effort service) a low priority. To assure more efficient bandwidth allocation in this case, the priority of the secondary traffic flow may be increased in the fault-free condition to allow the secondary traffic flow to use the reserved bandwidth "B" of the protect path 105. The priority of the secondary traffic flow may then be restored to its initial level after the detection of a network fault or switchover condition.

Figure 4:
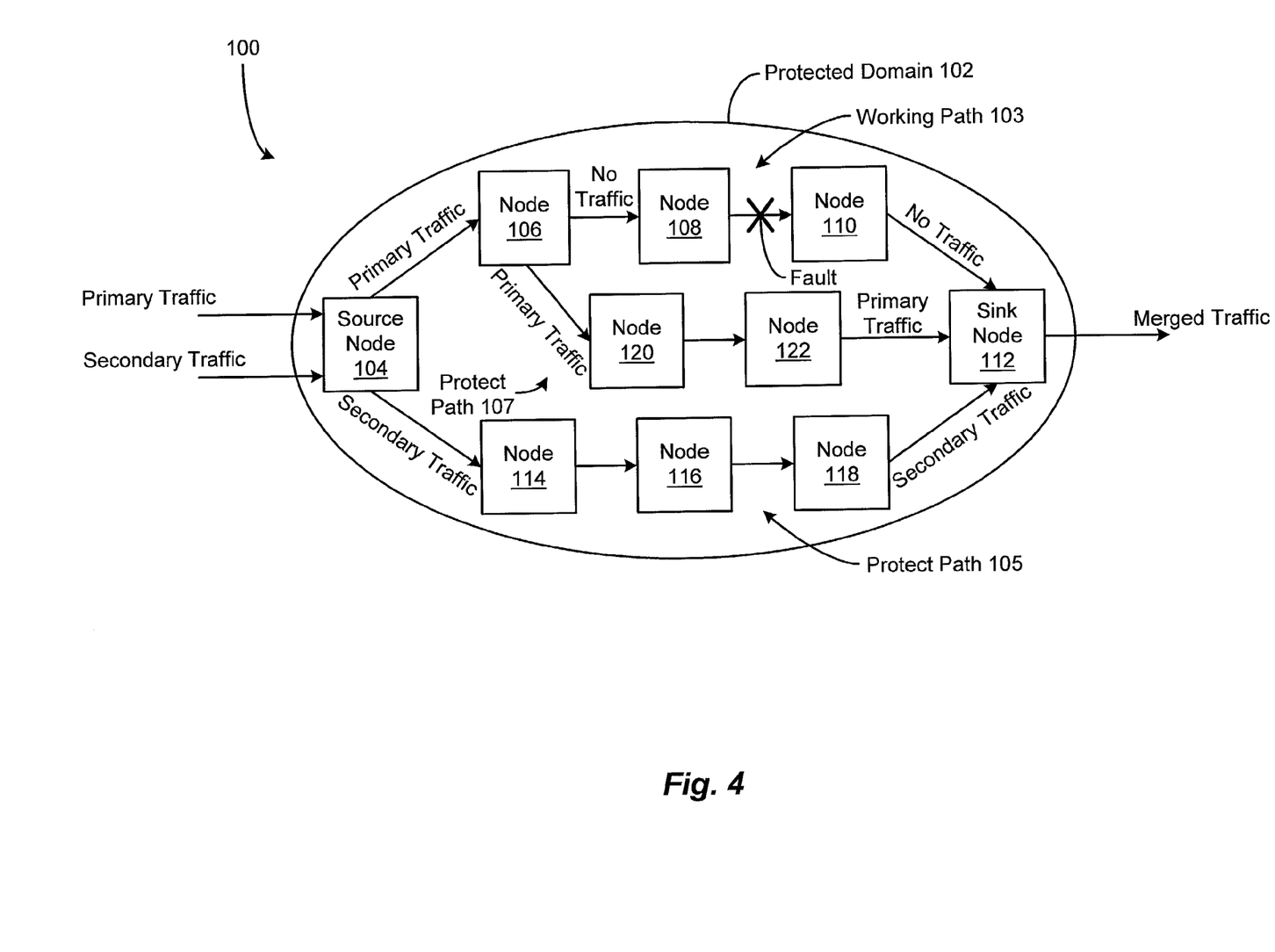
FIG. 4 is a block diagram of the protected domain of FIG. 1 depicting a traffic congestion avoidance technique according to the present invention.

FIG. 4 is a block diagram of the protected network domain 102 depicting a traffic congestion avoidance technique. For example, traffic congestion may result on the protect path 105 in a fault or switchover condition when the source node 104 merges the primary and secondary traffic flows and sends the merged traffic flow over the protect path 105 to the sink node 112. Such traffic congestion can increase the risk of losing at least some of the secondary data traffic carried by the protect path 105.

In the illustrated embodiment, in the event of a fault in the communications link (not numbered) coupling the intermediate node 108 to the intermediate node 110 of the working path 103, the signaling protocol dynamically establishes a second explicitly routed protect path 107 in addition to the first established protect path 105 to allow the primary and secondary traffic flows to be sent to the sink node 112 along separate protect paths.

In the illustrated example, the protect path 107 is established between the intermediate node 106 and the sink node 112 to by-pass the fault between the intermediate node 108 and the intermediate node 110. The source node 104 sends the primary traffic flow to the intermediate node 106, which subsequently sends the primary traffic flow over the dynamically established protect path 107 to the sink node 112. Further, the source node 104 sends the secondary traffic flow over the first established protect path 105 to the sink node 112. In effect, the protect path 107 becomes a new working path.

It is noted that the sink node 112 maintains the bindings between the labels associated with the primary and secondary traffic flows and the respective FEC(s) to allow it to accept the primary traffic flow from the protect path 107 and the secondary traffic flow from the protect path 105. Moreover, the protect path 107 is established with a reserved bandwidth sufficient to accommodate at least the first predetermined QoS level of the primary traffic flow.

Figure 5:
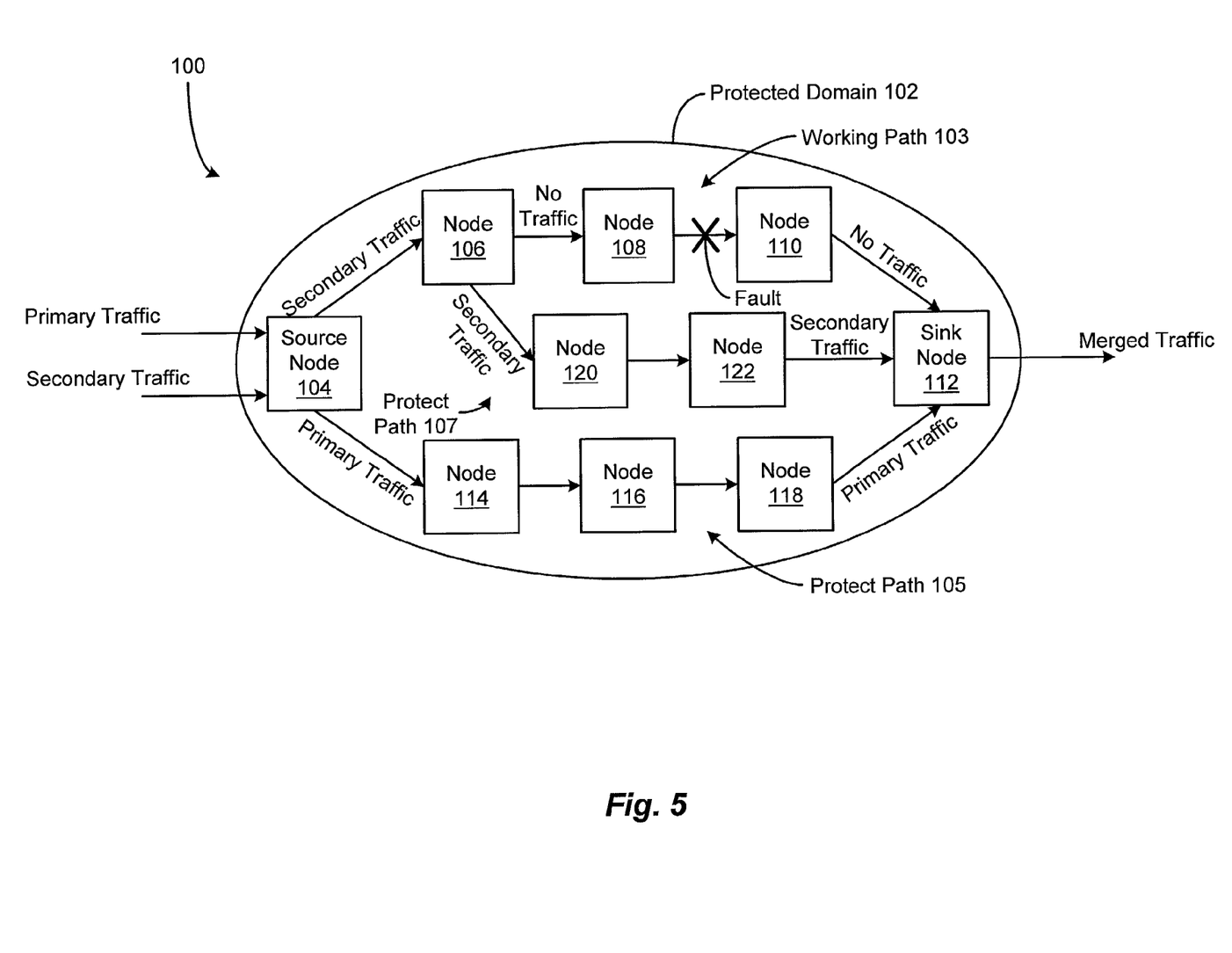
FIG. 5 is a block diagram of the protected domain of FIG. 1 depicting an alternative traffic congestion avoidance technique according to the present invention.

FIG. 5 depicts an alternative way of avoiding traffic congestion in the protected network domain 102 in the event of a network fault or switchover condition. In this alternative embodiment, the source node 104 sends the secondary traffic flow to the intermediate node 106, which subsequently sends the secondary traffic flow over the dynamically established protect path 107 to the sink node 112. Further, the source node 104 sends the primary traffic flow over the first established protect path 105 to the sink node 112. In effect, the first established protect path 105 becomes a new working path. It should be understood that the above-described traffic congestion avoidance technique may be suitably modified to avoid traffic congestion resulting from a failure of any node or link included in the protected network domain 102 or a switchover condition.

By configuring the source node 104 and the sink node 112 of the protected network domain 102 for selectively performing traffic trunk and label merging on primary and secondary traffic flows of the same FEC or different FECs, the primary and secondary traffic flows can be sent from the source node 104 to the sink node 112 with minimal disruption to the primary traffic flow and reduced loss of the secondary traffic flow in the event of a network fault or switchover condition. Moreover, by dynamically establishing alternate paths in the protected network domain 102 in the event of high traffic congestion on previously established paths, the loss of the secondary data traffic can be further reduced.

It will further be appreciated by those of ordinary skill in the art that modifications to and variations of the above-described system and method of performing protection switching may be made without departing from the inventive concepts disclosed herein. Accordingly, the invention should not be viewed as limited except as by the scope and spirit of the appended claims.

What is claimed is:

1. A method of protection switching for use in a communications system including a source node, a sink node, a first communications path configured to interconnect the source and sink nodes, and a second communications path configured to interconnect the source and sink nodes, comprising the steps of:

receiving at least one first incoming data unit and at least one second incoming data unit at the source node, the at least one first incoming data unit and the at least one second incoming data unit having a first label and a second label, respectively, associated therewith;

determining whether the first communications path is in a predetermined state;

in the event the first communications path is in the predetermined state, identifying the at least one first and second incoming data units for transmission over the first and second communications paths based upon the respective first and second labels, and sending first outgoing data corresponding to the at least one first incoming data unit from the source node to the sink node over the first communications path, and sending second outgoing data corresponding to the at least one second incoming data unit from the source node to the sink node over the second communications path; and in the event the first communications path is not in the predetermined state, identifying the at least one first incoming data unit and at least some of the second incoming data units for transmission over the second communications path based upon the respective first and second labels, merging the identified first and second incoming data units, associating a first common label with the merged first and second incoming data units, and sending third outgoing data corresponding to the merged first and second incoming data units along with the associated first common label from the source node to the sink node over the second communications path.

2. The method of claim 1 further including the step of, in the event the first communications path is not in the predetermined state, sending a first notification message that the first communications path is not in the predetermined state from the sink node to the source node over a communications link coupling the source and sink nodes.

3. The method of claim 2 further including the step of sending a first acknowledgment message in response to the first notification message from the source node to the sink node over the communications link coupling the source and sink nodes.

4. The method of claim 2 further including the step of sending a second notification message that the first communications path is not in the predetermined state from a node included in the first communications path to the sink node over a portion of the first communications path.

5. The method of claim 4 further including the step of sending a second acknowledgment message in response to the second notification message from the sink node to the node included in the first communications path over the portion of the first communications path.

6. The method of claim 4 wherein the step of determining whether the first communications path is in the predetermined state is performed by the nods included in the first communications path.

7. The method of claim 1 further including the step of, in the event the first communications path is not in the predetermined state, sending a plurality of notification messages that the first communications path is not in the predetermined state from the sink node to the source node over a plurality of respective communications paths interconnecting the source and sink nodes.

8. The method of claim 7 further including the step of sending at least one acknowledgment message in response to at least one of the plurality of notification messages from the source node to the sink node over at least one of the plurality of respective communications paths interconnecting the source and sink nodes.

9. A method of protection switching for use in a communications system including a source node, a sink node, a first communications path configured to interconnect the source and sink nodes, and a second communications path configured to interconnect the source and sink nodes, comprising the steps of:

receiving at least one first incoming data unit and at least one second incoming data unit at the source node, the at least one first incoming data unit and the at least one second incoming data unit having a first label and a second label, respectively, associated therewith;

determining whether the first communications path is in a predetermined state;

in the event the first communications path is in the predetermined state, identifying the at least one first and second incoming data units for transmission over the first and second communications paths based upon the respective first and second labels, and sending first outgoing data corresponding to the at least one first incoming data unit from the source node to the sink node over the first communications path, and sending second outgoing data corresponding to the at least one second incoming data unit from the source node to the sink node over the second communications path;

in the event the first communications path is not in the predetermined state, identifying the at least one first incoming data unit and at least some of the second incoming data units for transmission over the second communications path based upon the respective first and second labels, associating a first common label with the first and second outgoing data, respectively, and sending the first outgoing data and at least some of the second outgoing data along with the associated first common label from the source node to the sink node over the second communications path; and in the event the first communications path is in the predetermined state, associating a third label with the first outgoing data before sending the first outgoing data from the source node to the sink node over the first communications path, and associating a fourth label with the second outgoing data before sending the second outgoing data from the source node to the sink node over the second communications path.

10. The method of claim 9 further including the steps of receiving third and fourth incoming data corresponding to the first and second outgoing data, respectively, at the sink node, identifying the third and fourth incoming data for transmission over a third communications path based upon the respective third and fourth labels, associating a second common label with the third and fourth incoming data, and sending third and fourth outgoing data corresponding to the third and fourth incoming data, respectively, along with the associated second common label from the sink node to a subsequent node over the third communications path.

11. A method of protection switching for use in a communications system including a source node, a sink node, a first communications path configured to interconnect the source and sink nodes, and a second communications path configured to interconnect the source and sink nodes, comprising the steps of:

receiving at least one first incoming data unit and at least one second incoming data unit at the source node, the at least one first incoming data unit and the at least one second incoming data unit having a first label and a second label, respectively, associated therewith;

determining whether the first communications path is in a predetermined state;

in the event the first communications path is in the predetermined state, identifying the at least one first and second incoming data units for transmission over the first and second communications paths based upon the respective first and second labels, and sending first outgoing data corresponding to the at least one first incoming data unit from the source node to the sink node over the first communications path, and sending second outgoing data corresponding to the at least one second incoming data unit from the source node to the sink node over the second communications path;

in the event the first communications path is not in the predetermined state, identifying the at least one first incoming data unit and at least some of the second incoming data units for transmission over the second communications path based upon the respective first and second labels, associating a first common label with the first and second outgoing data, respectively, and sending the first outgoing data and at least some of the second outgoing data along with the associated first common label from the source node to the sink node over the second communications path, and in the event the step of sending the first and second outgoing data along with the associated common label over the second communications path causes traffic congestion on the second communications path, establishing an alternate communications path configured to interconnect the source and sink nodes, and sending a selected one of the first and second outgoing data from the source node to the sink node over the alternate communications path while sending the other outgoing data from the source node to the sink node over the second communications path.

12. A communications system configured to provide protection switching, comprising:

a source node configured to receive at least one first incoming data unit and at least one second incoming data unit, the at least one first Incoming data unit and the at least one second incoming data unit having a first label and a second label, respectively, associated therewith;

a sink node;

a first communications path configured to interconnect the source and sink nodes, the first path including at least one node; and a second communications path configured to interconnect the source and sink nodes, wherein the at least one node included in the first path and the sink node are configurable to determined whether the first path is in a predetermined state, wherein, in the event the first path is in the predetermined state, the source node is further configured to identify the at least one first and second incoming data units for transmission over the first and second paths based upon the respective first and second labels, to send first outgoing data corresponding to the at least one first incoming data unit from the source node to the sink node over the first path, and to send second outgoing data corresponding to the at least one second incoming data unit from the source node to the sink node over the second path, and wherein, in the event the first path is not in the predetermined state, the source node is further configured to identify the at least one first and second incoming data units for transmission over the second path based upon the respective first and second labels, to merge the identified first and second incoming data units, to associate a common label with the merged first and second incoming data units, and to send third outgoing data corresponding to the merged first and second incoming data units along with the associated common label from the source node to the sink node over the second path.

13. The system of claim 12 wherein the first and second paths comprise explicitly routed paths.

14. The system of claim 12 wherein the first and second incoming data units are part of the same forwarding equivalence class.

15. The system of claim 12 wherein the at least one first incoming data unit comprises at least one first traffic flow of a first predetermined quality of service level, and the at least one second incoming data unit comprises at least one second traffic flow of a second predetermined quality of service level.

16. The system of claim 15 wherein the first predetermined quality of service level is a constant bit rate service.

17. The system of claim 15 wherein the second predetermined quality of service level is a best effort service.

18. The system of claim 15 wherein the second path is further configured to accommodate respective bandwidths required by the first and second predetermined quality of service levels.

* * * * *